United States Patent
Brzezicki

(10) Patent No.: US 9,897,252 B2
(45) Date of Patent: Feb. 20, 2018

(54) OBJECT SECURING DEVICE

(71) Applicant: Cara J. Brzezicki, Littleton, CO (US)

(72) Inventor: Cara J. Brzezicki, Littleton, CO (US)

(73) Assignee: Cara Brzezicki, Littleton, CO (US)

( * ) Notice: Subject to any disclaimer, the term of this patent is extended or adjusted under 35 U.S.C. 154(b) by 0 days.

(21) Appl. No.: 15/243,977

(22) Filed: Aug. 23, 2016

(65) Prior Publication Data
US 2017/0051871 A1 Feb. 23, 2017

Related U.S. Application Data

(60) Provisional application No. 62/356,529, filed on Jun. 30, 2016, provisional application No. 62/208,706, filed on Aug. 23, 2015.

(51) Int. Cl.
| | |
|---|---|
| *F16M 13/02* | (2006.01) |
| *B25B 5/06* | (2006.01) |
| *B25B 5/16* | (2006.01) |
| *B25B 7/14* | (2006.01) |
| *B25B 7/08* | (2006.01) |
| *B25B 7/04* | (2006.01) |
| *F16B 2/10* | (2006.01) |

(52) U.S. Cl.
CPC ............. *F16M 13/022* (2013.01); *B25B 5/06* (2013.01); *B25B 5/068* (2013.01); *B25B 5/16* (2013.01); *B25B 5/166* (2013.01); *B25B 5/163* (2013.01); *B25B 7/04* (2013.01); *B25B 7/08* (2013.01); *B25B 7/14* (2013.01); *F16B 2/10* (2013.01)

(58) Field of Classification Search
CPC .. B25B 5/068; B25B 5/12; B25B 5/16; B25B 5/04; B25B 5/06; B25B 5/101; B25B 5/102; B25B 5/163; B25B 5/166; B25B 5/067; B25B 5/127; F16B 2/10; F16B 2/12
USPC ............ 248/231.21, 231.41, 231.61, 231.71; 269/3, 6, 130, 131, 228, 249
See application file for complete search history.

(56) References Cited

U.S. PATENT DOCUMENTS

| | | | | |
|---|---|---|---|---|
| 3,092,378 | A * | 6/1963 | Aulner | B25B 5/125 269/143 |
| 4,288,891 | A * | 9/1981 | Boden | F16G 11/101 24/115 G |
| 4,926,722 | A * | 5/1990 | Sorensen | B25B 5/067 269/166 |
| 5,459,903 | A * | 10/1995 | Treacy | A61J 9/0638 24/115 G |
| 6,254,073 | B1 * | 7/2001 | Noniewicz | B25B 5/068 269/170 |
| 6,585,243 | B1 * | 7/2003 | Li | B25B 5/068 269/171.5 |

(Continued)

*Primary Examiner* — Stanton L Krycinski
*Assistant Examiner* — Taylor L Morris

(57) ABSTRACT

The disclosure presented herein relates to a clamp, vice, clasp or similar structure with an upper and lower jaw capable of gripping a surface. In use the jaws are separated and placed around the surface before being closed and tightened such that the clamp, vice, clasp reversibly grips the surface. A cord, strap, leash or similar structure is attached to the clamp. A spring loaded plastic toggle is attached to the end of the cord, strap, leash or similar structure. In use the cord, strap, leash or similar structure is secured around an item with the spring loaded plastic toggle. As the cord, strap, leash or similar structure is secured to the clamp the item is also secured to the clamp and the surface.

7 Claims, 11 Drawing Sheets

(56) References Cited

U.S. PATENT DOCUMENTS

| | | | | |
|---|---|---|---|---|
| 6,676,120 B1* | 1/2004 | Hallbeck | ............... | B25B 5/068 269/6 |
| 7,017,894 B1* | 3/2006 | Lin | ............... | B25B 5/068 269/171.5 |
| 7,140,582 B1* | 11/2006 | Miller | ............... | B25B 5/068 248/229.22 |
| 7,614,617 B2* | 11/2009 | Marusiak | ............... | B25B 5/068 269/166 |
| 7,624,974 B2* | 12/2009 | Zheng | ............... | B25B 5/068 269/3 |
| 7,641,183 B2* | 1/2010 | Fuller | ............... | B25B 5/068 269/3 |
| 7,784,774 B2* | 8/2010 | Fuller | ............... | B25B 5/068 269/166 |
| 2002/0135117 A1* | 9/2002 | Weissenborn | ............... | A63C 11/26 269/131 |
| 2005/0061935 A1* | 3/2005 | Leedholm | ............... | A47D 15/00 248/231.71 |
| 2007/0023596 A1* | 2/2007 | Bilsky | ............... | A47B 97/00 248/228.6 |
| 2012/0304424 A1* | 12/2012 | Yang | ............... | F16B 2/12 24/457 |
| 2013/0340227 A1* | 12/2013 | Jaynes | ............... | B25B 9/00 29/426.5 |

* cited by examiner

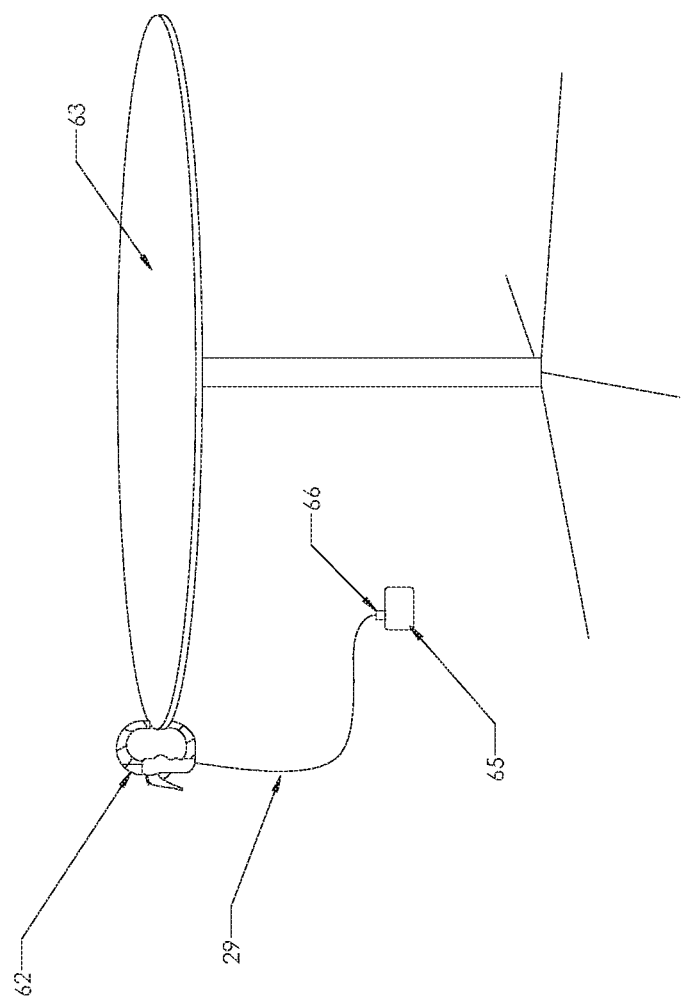

OBJECT SECURING DEVICE

CROSS-REFERENCE TO RELATED APPLICATIONS

This application claims priority to U.S. Provisional Application No. 62/356,529 filed Jun. 30, 2016 and 62/208,706 filed Aug. 23, 2015 respectively. The content of the above applications are incorporated by reference in their entirety.

FIELD OF THE DISCLOSURE

This disclosure relates generally to the field of securing objects to surfaces. More specifically the present invention relates to securing objects to a surface where a clamp, vice, clasp, adjustable tool, and the like attaches to a surface while a cord, strap, leash, and the like attached to the clamp with a spring loaded plastic lock toggle and the like attached to the end of the cord, leash, strap and the like secures an object to the clamp and thus to the surface.

BACKGROUND

Multiple scenarios exist in which securing an object to a surface would be desirable. Construction workers working high above the ground cannot drop tools less they hurt someone below them and cause time and resources recovering the tool to be wasted. Shop workers would not want to drop heavy, expensive tools to the floor lest they break or injure the user. Mothers have long dealt with babies knocking sippy cups, pacifiers, or bottles to the ground causing spills and contaminating the baby item. Cat and dog owners have long dealt with their beloved pets knocking items off shelves, cabinets and dresser drawers.

Current responses to this issue all suffer from the same drawbacks. They are either large and cumbersome or make the item unusable for its intended purpose. For the foregoing reasons a need exists for a simple, effective, method of securing objects to a surface that doesn't restrict the usefulness of the object.

SUMMARY

The disclosure presented herein relates to a clamp, vice, clasp or similar structure with an upper and lower jaw capable of gripping a surface. In use the jaws are separated and placed around the surface before being closed and tightened such that the clamp, vice, clasp reversibly grips the surface. A cord, strap, leash or similar structure is attached to the clamp. A spring loaded plastic toggle is attached to the end of the cord, strap, leash or similar structure. In use the cord, strap, leash or similar structure is secured around an item with the spring loaded plastic toggle. As the cord, strap, leash or similar structure is secured to the clamp the item is also secured to the clamp and the surface. In an embodiment the clamp consists of two jaws attached to a metal bar. As the bar moves one handle moves in relation to the other opening the jaws such that the clamp can be attached to a table. In an embodiment the clamp consists of two curved handles attached to each other by a pin such that the handles create a jaw that can be open or closed. A ratchet connects the upper to the lower handle in such a way that movement of the handles relative to each other can be arrested. The preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 11 is a view of the object securing device in use

DETAILED DESCRIPTION

Figure 1:
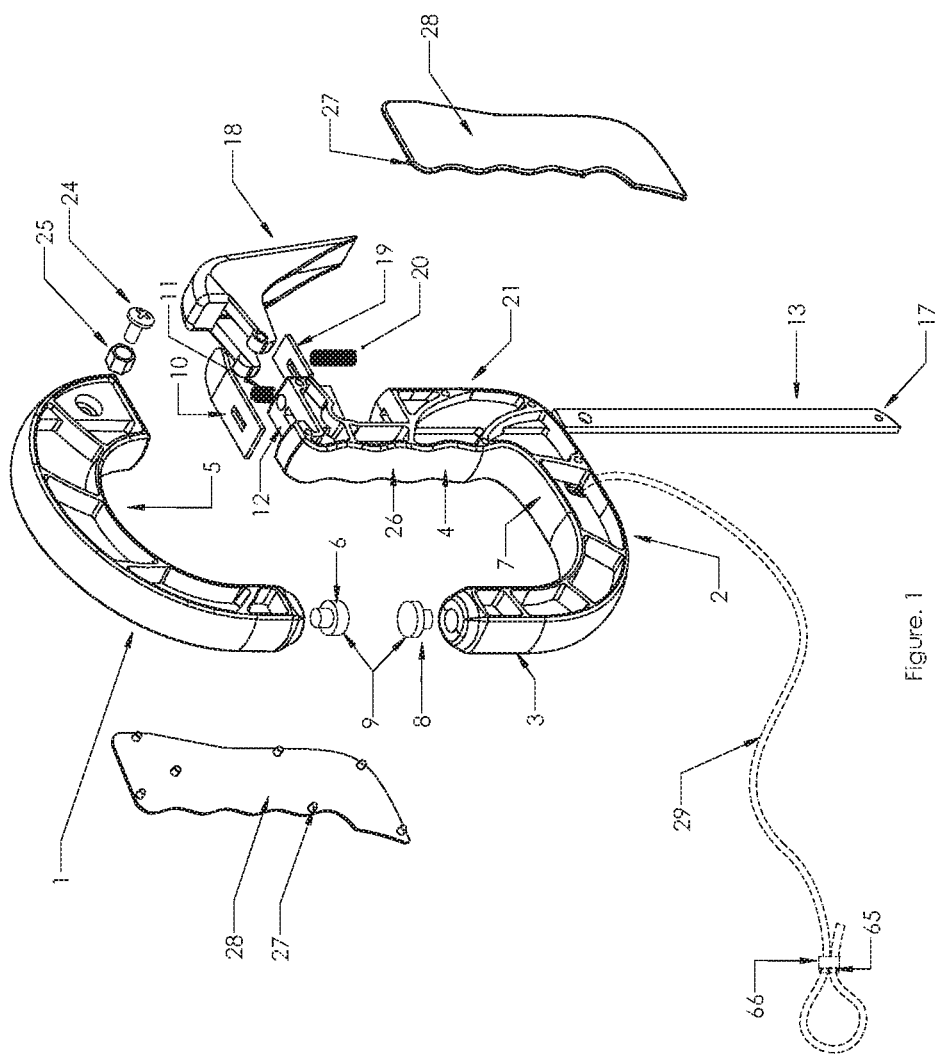
FIG. 1 is an exploded view of one embodiment of the invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

In its broadest sense the disclosure consists of a clamp, vice, clasp or similar structure with an upper and lower jaw capable of gripping a surface. In use the jaws are separated and placed around the surface before being closed and tightened such that the clamp, vice, clasp reversibly grips the surface. A cord, strap, leash or similar structure is attached to the clamp. A spring loaded plastic toggle is attached to the end of the cord, strap, leash or similar structure. In use the cord, strap, leash or similar structure is secured around an item with the spring loaded plastic toggle. As the cord, strap, leash or similar structure is secured to the clamp the item is also secured to the clamp and the surface.

In a preferred embodiment as shown in FIG. 1 the securing device consists of a clamp with a curved upper 1 and lower jaw 2. The distance from the inside left 3 of the upper or lower curve to the inside right 4 of the upper or lower curve is 2.0 to 3 inches giving the upper or lower curve an internal radius of 1.0 to 1.5 inches. The distance from the upper jaw's inner wall at the point of highest curvature 5 to the top of the protective foot attached to the upper jaw 6 is preferably between 2 and 4 inches. The distance between the lower jaw's lower wall at the point of highest curvature 7 and the end of the protective foot attached to the lower jaw 8 is likewise between 2 and 4 inches. Depending on the size of the surface the clip needs to be attached to the upper 1 and lower jaws 2 could be any height but a 2 inch opening between the jaws at closest approach 9 has been found to be suitable for most applications. These dimensions allow the securing device to fit inside a bag, purse, and the like.

Figure 2:
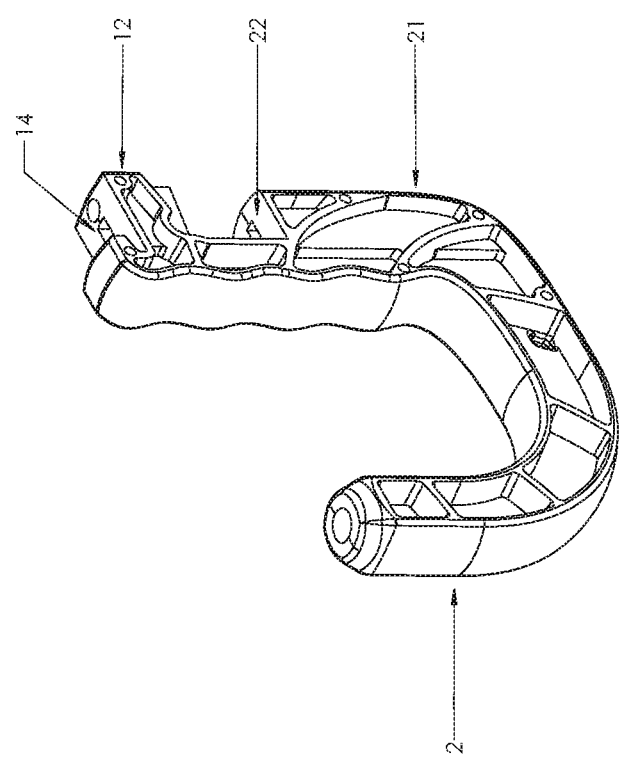
FIG. 2 is a close up view of the lower jaw from FIG. 1
Figure 3:
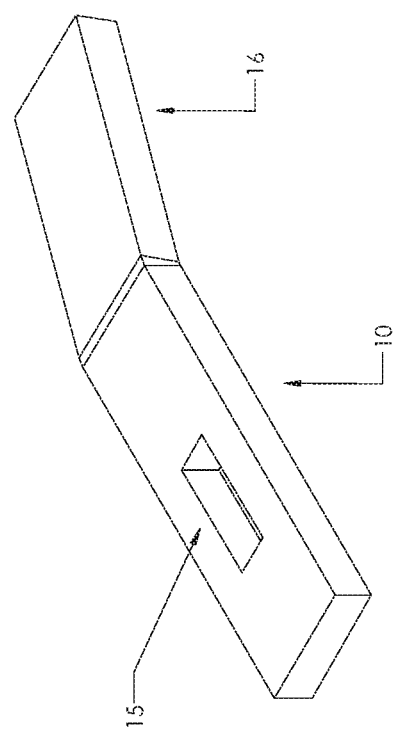
FIG. 3 is a close up view of the release trigger from FIG. 1

A release trigger 10 sits on a lock return spring 11 which sits on top of a narrow horizontal segment 12 that is part of the lower jaw 2. The upper 1 jaw is attached to a vertical metal bar 13 that runs vertically through a hole, 14 in FIG. 2, in the narrow horizontal segment 12, the lock return spring 11 and a hole 15 in the release trigger 10 as seen in FIG. 3. The release trigger 10 sits in a groove on the lower jaw and is angled such that when not pressed the vertical metal bar 13 is allowed to slide downward bringing the upper 1 and lower 2 jaws into close proximity. The angle of the release trigger 10 along with the upward force provided by the lock return spring 11, however, prevents the vertical metal bar 13 and the upper jaw 1 from being pulled up unless the release trigger 10 is pressed downward. When the release trigger 10 is pressed downward on the angled piece 16 (FIG. 3) which extends out of the lower jaw 2 the adjustment of the release trigger's 10 angle along with the downward force transferred by the release trigger 10 to the lock return spring 11 allows the vertical metal bar 13 and the upper jaw 1 to be pulled upward. A pin 17 at the bottom of the vertical metal bar 13 prevents the vertical metal bar 13 from being pulled out of the lower jaw 1. Preferably the pin 17 is positioned ⅛ of an inch from the bottom of the vertical metal bar 13 and stops the vertical metal bar 13 from moving more than 2 inches past the bottom of the lower jaw 2.

Figure 4:
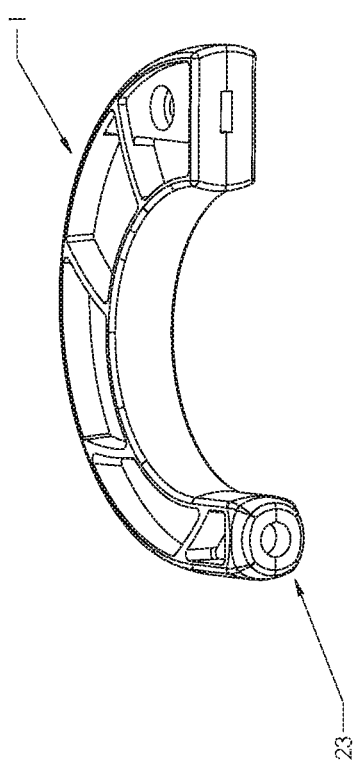
FIG. 4 is a side view of the upper jaw from FIG. 1
Figure 5:
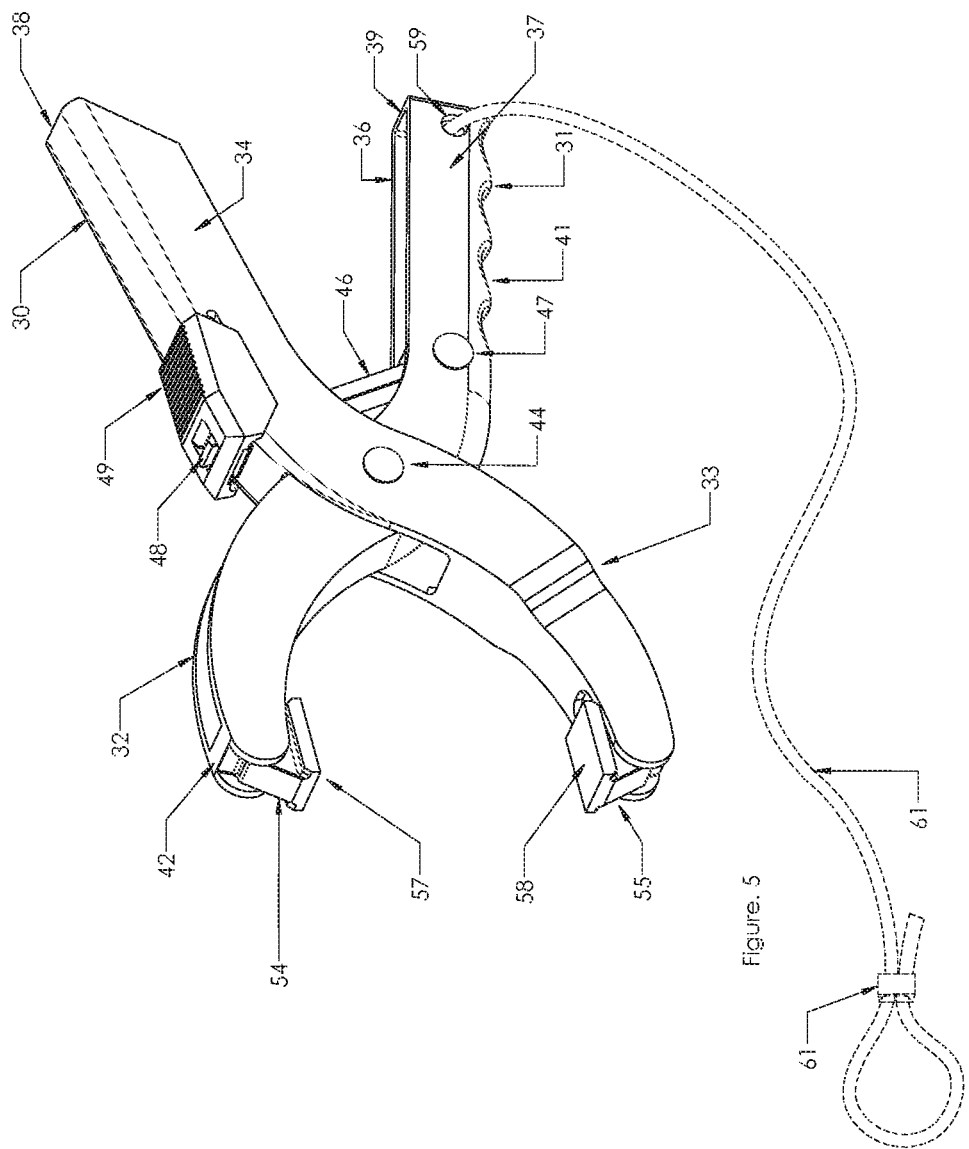
FIG. 5 is a side view of another embodiment of the invention
Figure 6:
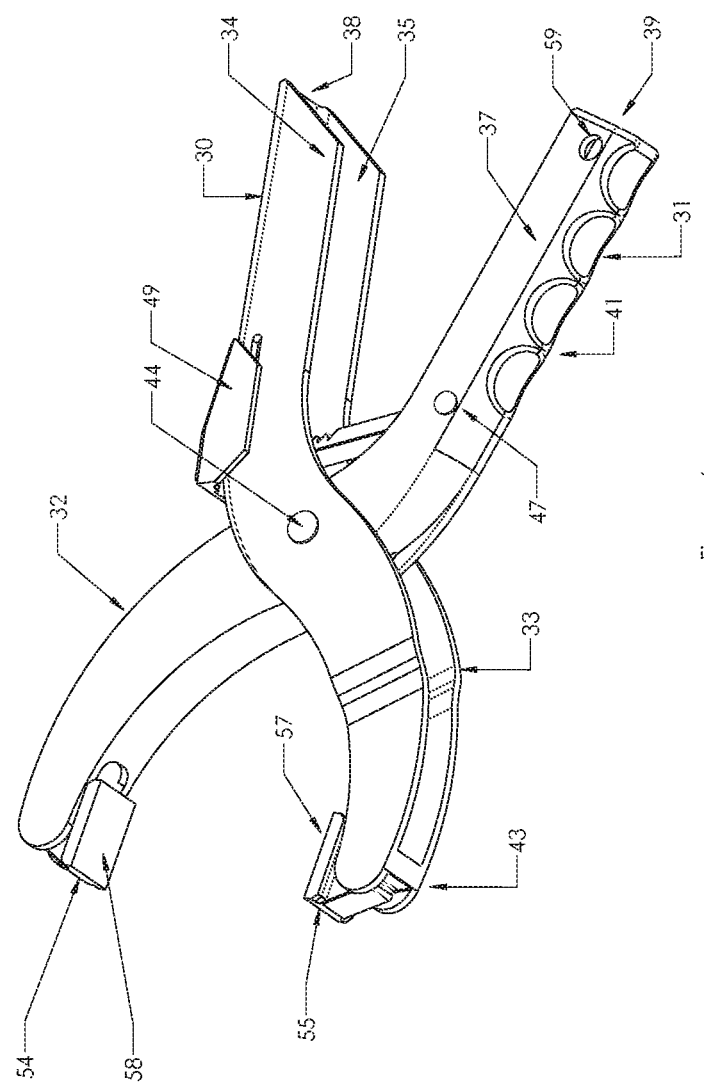
FIG. 6 is a perspective view of the embodiment in FIG. 5
Figure 7:
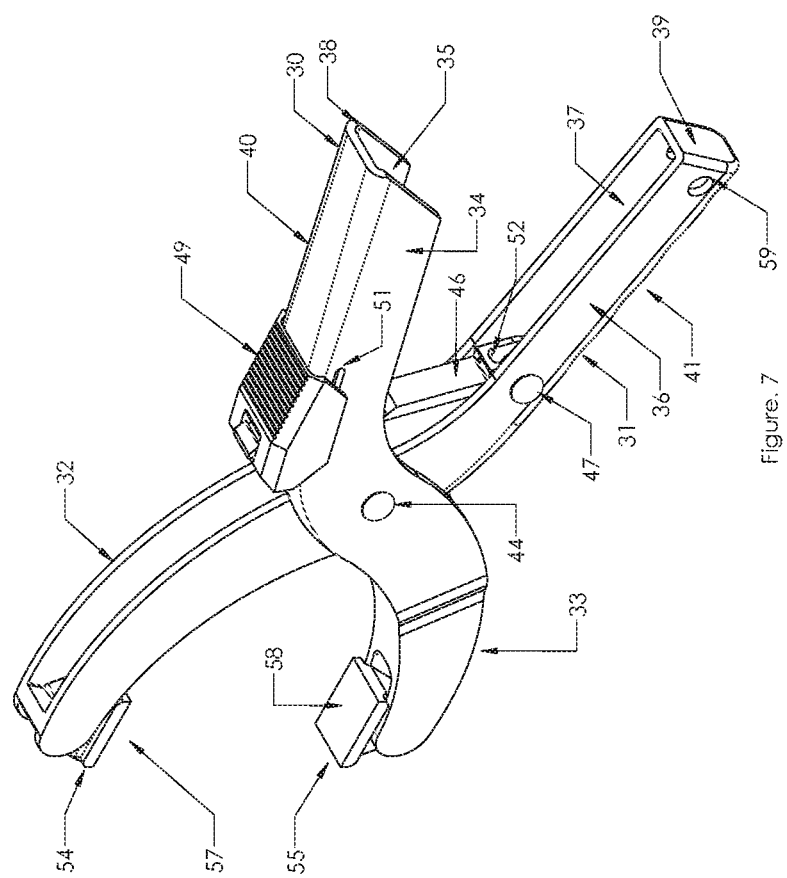
FIG. 7 is the embodiment in FIG. 5 viewed from above and behind
Figure 8:
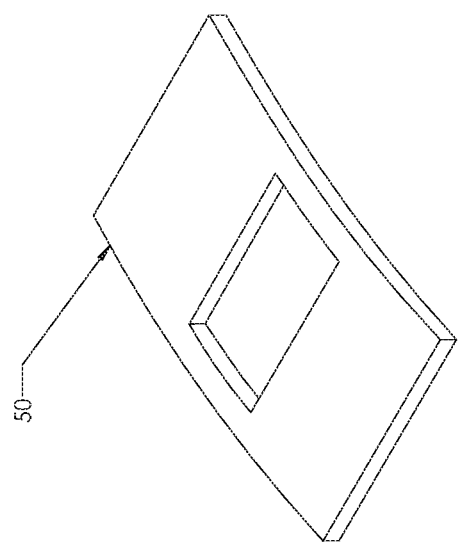
FIG. 8 is a close up view of the locking plate from FIG. 5
Figure 9:
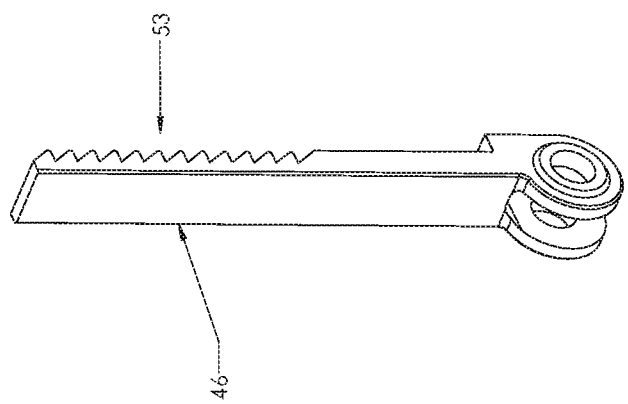
FIG. 9 is a close up view of the ratchet from FIG. 5
Figure 10:
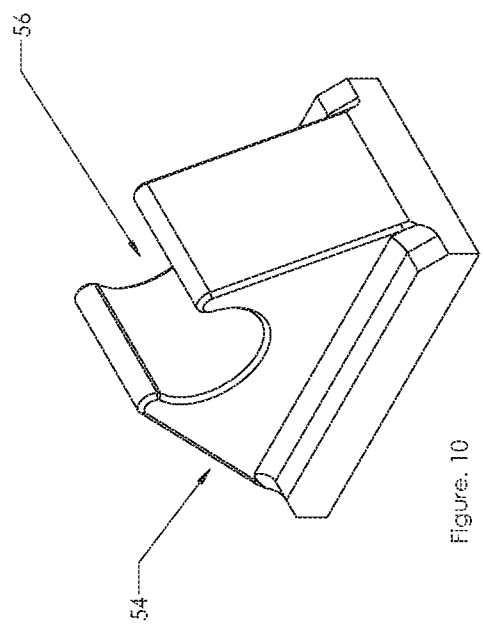
FIG. 10 is a close up view of the clamp ends in FIG. 5

Underneath the narrow horizontal segment 12 of the lower jaw 2 a clamp trigger 18 sits atop a bar lock 19 which sits atop a compression spring 20 which sits atop a wide vertical section 21 of the lower jaw 2. The vertical metal bar 13 discussed above slides through an opening, 22 in FIG. 2, in the wide vertical section 21 of the lower jaw 2 and continues through the compression spring 20, the bar lock 19, and the clamp trigger 18 before continuing through the lock return spring 11 and the rest of the lower jaw 2 as described above. The vertical metal bar 13 then continues through a hole, 23 in FIG. 4, in the bottom of the upper jaw 1. At the top of the upper jaw 1 a screw 24 and a nut 25 secures the vertical metal bar 13 to the upper jaw 1. The compression spring 20 along with the bar lock 19 keeps the vertical metal bar 13 from moving downward. When the clamp trigger 18 depresses the compression spring 20 the vertical metal bar 13 moves downward bringing the upper jaw 1 closer to the bottom jaw 2. Grooves 26 on both the upper 1 and the lower 2 jaw improve the upper 1 and lower 2 jaws' grip on the surface in the closed position. Feet 6 and 8 at the ends of the upper 1 and lower 2 jaw help protect the surface being gripped.

The lower jaw 2 has a plurality of holes throughout. Pins 27 attached to cover plates 28 fit inside these holes which along with adhesive attaches the cover plates 28 to the lower jaw 2. The cover plates 28 cover and protect the release trigger 10, the bar lock 19, the compression spring 20, the lock return spring 11, the bottom portion of the lower jaw 2 and a portion of the clamp trigger 18.

A cord, strap, leash or similar structure 29 is threaded through a hole in the lower jaw 2. A cord lock or similar structure 66 is attached to the distal end of the cord, leash, or similar structure 29 such that a loop capable of being expanded or contracted is created in the cord.

The jaws 1 and 2, release trigger 10, clamp trigger 18, bar lock 19, and the cover plates 27 can be made of any suitable material known in the art though they are preferably made of plastic. The vertical metal bar 13 and springs 20 and 11 can be made of any suitable material though both are preferably made of aluminum or steel. The cord 29 is preferably made of paracord and the feet 6 and 8 are preferably made of rubber but both can be made of any suitable material known in the art.

In an alternative embodiment shown in FIGS. 5-10 the item securing device consists of two handles 30 and 31 curved on their distal ends. One handle 31 curves in a downward direction while one 30 curves in an upward direction and the two handles are crossed such that the distal ends form a clamp with an upper 32 and lower 33 jaw. Both handles contain two side walls 34-37, a back wall 38-39, an enclosing wall 40-41 (seen best in FIG. 7) and a front bar 42-43 (seen best in FIG. 5 and FIG. 6). Side walls 34-37 extend from the back wall 38-39, which runs generally perpendicular to the side walls 34-37, to slightly past the front bar 42-43 on their respective handles. On the upward curving handle 30 the enclosing wall 40 sits atop the side 34, 35 and back 38 walls such that the enclosing wall 40, the side walls 34, 35, the back wall 38, and front bar 42 define an open space below the enclosing wall 40. On the downward curving handle the enclosing wall 41 sits below the side walls 36, 37 such that the side walls 36, 37, the back wall 39, the enclosing wall 41 and the front bar 43 define an open space above the enclosing wall 41. On both handles the enclosing wall 40, 41 ends before the front bar 42, 43 such that the side walls 34-37 and the front bar 42-43 define an open space on both sides of the front bar 42-43. The handles are connected by a pin 44, extending horizontally through both handles 30, 31 where the handles 30, 31 cross, and a ratchet strip 46 that extends through the upward curving handle 30 to the downward curving handle 31. The ratchet strip 46 is attached to the downward curving handle 31 by a pin 47, but extends up through a hole 48, a thumb release 49 and a locking plate 50 into the upward curving handle 30. The locking plate 50 lies on top of handle 30 below thumb release 49.

Due to a very tiny slot 51 in the side of the upwardly curving handle 30 the thumb release 49 can slide back and forth. As the thumb release 49 slides back and forth more or less of the ratchet strip 46 emerges from the hole 48 in the upwardly curving handle and the thumb release 49. A pin 47 attaches the ratchet strip 46 and a torsion spring 52 to the downwardly curving handle 31. The torsion spring 52 extends horizontally from one end of the downwardly curving handle 31 to another. When the thumb release 49 is pressed the upwardly 30 and downwardly 31 curving handles can be moved closer or farther away causing the torsion spring 52 to force more or less of the ratchet strip 46 out of the hole 48 in the upwardly curving handle 30 and the thumb release 49. When the desired distance between the curved distal ends of the upward and downward curving handles 30-31 is reached a locking plate 50 is used to keep the ratchet strip 46 from moving and the curved distal handle ends at the desired distance apart. Teeth, 53 in FIG. 9, in the ratchet strip 46 fit into groves in the locking plate 50 and the ratchet strip 46 is thus kept from moving once the locking plate 50 is in place.

A clamp end 54-55 is attached to the distal curved end of both handles 30-31. Groves, 56 in FIG. 10, on the clamp ends 54-55 allow the clamp ends 54-55 to be attached to the handles' 30-31 front bars 42-43 and to pivot about the front bars 42-43 in the front and back open space defined by the handles' 30-31 side walls 34-37 and front bar 42-43. Protective feet 57-58 are attached to the clamp ends 54-55.

A cord, leash, strap or similar structure 61 is threaded through a hole 59 in the downward curving handle 31. A cord lock or similar structure is attached to the distal end of the cord, leash, or similar structure 61 such that a loop capable of being expanded or contracted is created in the cord 61.

The handles 30-31, thumb release 49, ratchet strip 46, and locking plate 50 are preferably made of plastic but can be made of any suitable material known in the art. The pins 44 and 47, as well as spring 52 are preferably made of metal but can be made of any suitable material known in the art. The cord 61 is preferably made out of paracord but can be made of any suitable material known in the art. The protective feet 57-58 attached to the clamp ends 54-55 are preferably made out of silicon but can be made out of any suitable material known in the art.

METHOD OF USE

To use the first embodiment the release trigger 10 is pressed. This changes the angle of the release trigger 10 along with applying downward force to the lock return spring 11. The vertical metal bar 13 and the upper jaw 1 can then be pulled upward until enough space is created between the upper 1 and lower 2 jaws to attach the clamp, 62 in FIG. 11, to the surface 63. The clamp 62 is then tightened by depressing the clamp trigger 18 which depresses the compression spring 20 and moves the vertical metal bar 13 and the upper jaw 1 down until the clamp 62 is tightly attached to the surface 63. An object 65 is then placed into the loop created by the cord 29 and the cord lock 66 slid along the cord 29 until the loop is tight around the object 65. The object 64 can now be placed on the surface 63 in confidence that if it is knocked off the cord 29 and clamp 62 will keep it connected to the surface 63.

The second embodiment is used by first sliding the thumb release 49 forward to release the ratchet strip 46. Once the ratchet strip 46 is released the handles 30-31 naturally move apart. Once the jaws are open enough they are placed around the surface. The upwardly and downwardly curving handles 30-31 are squeezed until the jaws close around the surface. The thumb release 49 is then slide back to secure the ratchet 46 and the jaws in place. An object is then placed into the loop created by the cord 61 and the cord lock slid along the cord 61 until the loop is tight around the object. The object can now be placed on the surface in confidence that if it is knocked off the cord 61 and clamp will keep it connected to the surface.

While preferred and alternate embodiments have been illustrated and described, as noted above, many changes can be made without departing from the spirit and scope of the object securing device. Accordingly, the scope of the object securing device is not limited by the disclosure of these preferred and alternate embodiments. Instead, the scope of the invention title be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶ 6. In particular, the use of "step of" in the claims herein is not intended to invoke the provisions of U.S.C. § 112 ¶ 6.

I claim:

1. An object securing device comprising:
    a clamp further comprising:
    a predominantly vertical bar having a proximal end which defines a proximal hole;
    a downwardly curving member having a predominantly straight portion, a curved portion, a distal end, and a proximal end attached to the proximal hole of the vertical bar;
    an upwardly curving member having a curved portion and a predominantly vertical portion, the curved portion comprising a distal end and a proximal end, the predominantly vertical portion extending upwardly from the proximal end of the curved portion in order to surround the distal end of the vertical bar such that the downwardly curving member and the upwardly curving member define a receiving space;

a connecting member having a distal end attached to the curved portion of the upwardly curving member; and an attachment means attached to the distal end of the connecting member such that the connecting member can be wrapped around an object and attached to itself such that it forms a loop capable of being expanded and contracted;

wherein the predominantly vertical portion of the upwardly curving member further comprises:
  a wide predominantly vertical segment having a distal end and a proximal end, the wide predominantly vertical segment containing left and right sides that define a cavity which surrounds the vertical bar;
  a narrow predominantly vertical segment having a proximal end, the narrow predominantly vertical segment extending predominantly vertically from the proximal end of the wide predominantly vertical segment;
  a predominantly horizontal segment having left and right sides that define a cavity which surrounds the vertical bar, and a top end, the predominantly horizontal segment extending from the proximal end of the narrow predominantly vertical segment in a predominantly horizontal direction away from the receiving space defined by the downwardly curving member and the upwardly curving member such that the narrow predominantly vertical segment and the wide predominantly vertical segment define an open space;
  a first spring having a top end and a bottom end, the bottom end being attached to the top end of the predominantly horizontal portion such that the predominantly vertical bar extends through a center of the first spring;
  a first restraining member having a proximal end comprising left and right sides that define a cavity which surrounds the predominantly vertical bar, and a distal end that extends beyond the first spring at an angle to the proximal end of the first restraining member, wherein the proximal end of the first restraining member is attached to the top end of the first spring such that the vertical bar extends through the second restraining member;
  a second spring having a top end and a bottom end, the bottom end being connected to the proximal end of the wide predominantly vertical segment such that the predominantly vertical bar extends through a center of the second spring;
  a second restraining member having left and right sides that define a cavity which surrounds the predominantly vertical bar, the second restraining member being attached to the top end of the second spring such that the vertical bar extends through the second restraining member;
  wherein the first restraining member and the second restraining member are configured to respectively compress the first spring and second spring such that the vertical bar and the downwardly curving are able to move upwardly when the first spring is compressed and move downwardly when the second spring is compressed; and
  said predominantly vertical portion further comprising a plurality of holes on two external sides; and
  two cover plates comprising a plurality of pins received by the holes on respective sides of the predominantly vertical segment such that the two cover plates protect the springs and a portion of the restraining members.

2. The object securing device of claim 1, wherein the downwardly and upwardly curving members are made of plastic.

3. The object securing device of claim 1, wherein the vertical bar, the first spring, and the second spring are made of aluminum.

4. The object securing device of claim 1, wherein the vertical bar, the first spring, and the second spring are made of steel.

5. The object securing device of claim 1, wherein the connecting member is made of paracord.

6. The object securing device of claim 1, wherein the clamp further comprises protective feet attached to the distal ends of the upwardly and downwardly curving members.

7. The object securing device of claim 6, wherein the protective feet are made of silicon.

* * * * *